United States Patent Office 3,248,285
Patented Apr. 26, 1966

3,248,285
ALLANTOIN-FORMALDEHYDE CONDEN-
SATION PRODUCTS
Philip A. Berke, Milburn, N.J., assignor to Sutton
Laboratories, Inc., Roselle, N.J., a corporation of
New Jersey
No Drawing. Filed Aug. 16, 1962, Ser. No. 217,289
17 Claims. (Cl. 167—33)

This invention relates to new monomeric and polymeric compounds obtained by the reaction of allantoin with formaldehyde and which new compounds have been found to have new and useful biological, chemical and physical properties.

The new compounds are, in general, prepared by condensing allantoin and formaldehyde in the proportions of one mole of allantoin to at least about one-half mole of formaldehyde. Depending upon the proportions of the reactants and the reaction conditions, a wide variety of new compounds can be produced. Allantoin and formaldehyde are mixed in the selected proportions preferably with stirring and either with or without a catalyst and the mixture then refluxed for one or more hours, or the reaction can be carried out at room temperature over a longer period of time. The reaction mixture is filtered and the clear filtrate is further processed as is or may be acidified and it is then concentrated to eliminate volatiles. The concentrate is at first a thin syrup, then a viscous liquid, and finally a clear and transparent film which can be converted into a powder by grinding. Some of the compounds thus produced are soluble in water but insoluble in alcohol, some are soluble both in water and in alcohol, and some are insoluble both in water and in alcohol. Certain of the compounds are insoluble or only sparingly soluble in the usual organic solvents but are soluble in formamide, dimethylformamide, aqueous formaldehyde, sulfuric acid and/or aqueous alkali.

It has been found that when allantoin and formaldehyde condense in accordance with the invention, then condensation takes place at the nitrogen atoms of the allantoin molecule to form compounds of the formula:

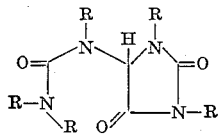

wherein each R is selected from the group consisting of H, —CH$_2$OH and >CH$_2$. All R's, however, are not simultaneously hydrogen. Other than the just-stated limitation, the various nitrogen atoms in the allantoin molecule can be substituted as to their hydrogen atoms with either a methylol group or a methylene group. When any R is >CH$_2$, both bonds may be attached to the same nitrogen atom or to two different nitrogen atoms. In the former case and when that nitrogen atom has two other groups attached to it, a positive charge arises at the nitrogen atom. In the latter case and where the nitrogen atom has only one other group attached to it, there is no charge and the nitrogen atom is electrically neutral. In addition, the methylene group can act as a bridge between one allantoin molecule and another and also serve as the R group on corresponding or non-corresponding nitrogen positions in the thus linked allantoin molecules. In the latter way, a variety of polymers can be formed under varying conditions having methylene bridges linking the monomeric units and having a variety of attached R groups.

It has further been found that the formation of either methylol groups or methylene bridges can be encouraged by suitable variation in the reaction temperature and time and by the presence or absence of a catalyst. When a catalyst is used, it can be either acidic or basic. The products resulting thus can be given a wide range of chemical, physical and biological properties. By way of illustration, when one-half mole of formaldehyde is condensed with one mole of allantoin in the presence of a basic catalyst and under reflux for one hour, complete reaction occurs and the reaction product is water soluble. If however the basic catalyst is omitted, the other conditions being the same, the reaction proceeds with the utilization of approximately only fifty percent of the allantoin and the isolated reaction product, while water soluble, has a different composition from that obtained when the basic catalyst is used. By reacting the same proportions of reactants in the absence of the basic catalyst but under reflux for six hours instead of one hour, then the reaction is complete and no unreacted allantoin can be detected. The product is, however, insoluble in water. When 1.5 moles of formaldehyde and 1 mole of allantoin are condensed in the presence of a basic catalyst at room temperature for a period of approximately eight days, it is found that a new condensation product is obtained in a yield of approximately 75 percent with the remaining 25 percent being unreacted allantoin. The new compound is soluble both in alcohol and in water.

The new condensation products are useful as intermediates in the preparation of plastics, pharmaceuticals and various industrial products. By way of illustration, the condensation products can be converted to new derivatives by introducing in a manner per se known various substituents into the diketotetrahydroimidazole ring or onto the ureide portion or the attached methylol or methylene groupings. For instance, the condensation products can be subjected to N-chlorination and the resulting compounds have bleaching, germicidal and antiseptic power. Furthermore, the new condensation products can be converted to salt form including quaternary ammonium salts by reaction with suitable acids or bases. In addition, the new condensation products can be hydrolyzed or oxidized to new types of amino acids. Because of the fact that many of the new condensation products are very water soluble, aqueous solutions of very high concentration and varying viscosity can be readily prepared and then when these solutions are dried, they form clear, transparent, hard and glossy films. In the event that it is desired to plasticize such films any of the usual or known plasticizing agents can be employed such as dibutyl phthalate. In this manner the hardness, toughness or resiliency of the films can be varied or predeterminedly altered. The unique ability of the new condensation products to form solutions of varying or predetermined viscosity and clear, transparent, hard and glossy films makes it possible to incorporate the allantoin-formaldehyde condensation products into a number of plastic, pharmaceutical, cosmetic and industrial formulations. The film-forming properties of allantoin-formaldehyde condensation products are very similar to those of polyvinylpyrrolidone, but the latter being a polymer of very high molecular weight is undesirable for use in connection with products coming into contact with the human body or the hair since inhalation of polyvinylpyrrolidone spray or vapor has been known to cause fatalities. This is not true, however, of the new allantoin-formaldehyde condensation products, some of which are of relatively low molecular weight even in their polymeric form. These low molecular weight polymers constitute a safe and satisfactory substitute for PVP in hair preparations such as hair sprays. Because of their unusual film-forming properties, the new allantoin-formaldehyde condensation products are valuable additives to many existing products such as hair preparations, hand lotions, wave sets, protective hand creams, foam shave preparations, deodorant sprays, after-shave lotions, shampoos, detergents, cleaners, and various other products such as preparations for treating burns, industrial sanitizing solutions, adhesives and emulsion stabilizers. The new condensation products of allantoin and formaldehyde which have good water solubility and film-forming properties are colorless, odorless and tasteless, have bacteriostatic and/or bactericidal properties against a variety of bacteria and are relatively non-toxic and non-irritating.

Oral administration to rats in doses as high as 8 grams per kilogram of body weight did not result in any deaths. An intravenous injection of 150 milligrams per kilogram of body weight of rabbits produced no toxic effects. A 20 percent aqueous solution applied to the eye of a rabbit according to the Draize procedure, showed absolutely no irritation. The compounds also have marked spermicidal activity when tested according to the procedure of Brown and Gamble (Human Fertility, volume 5, page 90, 1940).

Being characterized by low toxicity the new allantoin-formaldehyde condensation products are useful in the preservation of water and food. By incorporating 0.5 percent of such condensation product in pasteurized homogenized milk, the milk remained fresh at room temperature for over thirty days, whereas control milk at room temperature curdled in twenty-four hours. The bacteriostatic and bactericidal properties of the new condensation compounds make them useful for agriculture and in the paint, plastic and textile industries.

The invention is further illustrated by the following non-limitative examples.

Example I

A mixture of 15.8 grams (0.1 mole) of allantoin, 4.1 grams (0.05 mole) of 37 percent aqueous formaldehyde solution and 28.5 milliliters of tap water was refluxed for one hour in a round-bottom glass flask heated by a thermostatically controlled heating mantle. The heat was discontinued and the slurry allowed to set overnight at room temperature. There was no discernible odor of formaldehyde at this time. The slurry was filtered on a Buchner funnel. The unreacted precipitate was dried in vacuo at 70° C. It weighed about 8 grams and had a melting point of 221° C. to 222° C. indicating that it was unreacted allantoin. Samples of the clear filtrate when dried at room temperature or in vacuo at about 70° C. formed a clear, transparent, glossy, hard film which was readily soluble in water but only very slightly soluble in alcohol.

Example II

A mixture of 15.8 grams (0.1 mole) of allantoin, 4.1 grams (0.05 mole) of 37 percent aqueous formaldehyde solution and 28.5 milliliters of tap water was refluxed for five and one-half hours in a round-bottom glass flask heated by a thermostatically controlled heating mantle. The heat was discontinued and the slurry allowed to set overnight at room temperature. There was no discernible odor of formaldehyde at this time. Essentially all of the allantoin had reacted since there was only a slight cloud. The solution was filtered to give a crystal clear solution. An excess of ethanol was added to the aqueous solution and this resulted in the precipitation of an off-white precipitate which was filtered off and dried in vacuo. The dried precipitate did not melt at 320° C., was insoluble in water or alcohol, but was readily soluble in aqueous alkali.

Example III

A mixture of 15.8 grams (0.1 mole) of allantoin, 12.2 grams (0.15 mole) of 37 percent aqueous formaldehyde solution, 0.3 gram of sodium hydroxide and 35 milliliters of water was mixed thoroughly and allowed to stand at room temperature for seven days. The slurry was filtered and the precipitate was dried in vacuo at 55° C. It weighed 4 grams and represented the unreacted allantoin. A sample of the clear filtrate when dried at room temperature or by hot-air blower formed a clear transparent film. The allantoin-formaldehyde condensation product thus produced was very soluble in water and readily soluble in 70 percent alcohol.

Example IV

A mixture of 600 grams of allantoin (3.8 moles), 450 grams (5.5 moles) of 37 percent aqueous formaldehyde solution and 12 grams of sodium hydroxide was refluxed for one hour. Concentrated acetic acid was added to a pH of 4 and the solution was gradually concentrated to a clear viscous liquid which was poured into shallow trays and dried in vacuo at 70° C. The dried glass-like product was very soluble in water, relatively insoluble in alcohol and somewhat hygroscopic. When aqueous solutions of this allantoin-formaldehyde compound were administered orally to rats in doses as high as 8 grams per kilogram of body weight, it did not kill any of the animals. A 20 percent aqueous solution of the product applied to the eye of the rabbit according to the Draize procedure showed absolutely no irritation of any sort. An 0.8 percent aqueous solution showed marked human spermicidal activity when tested according to the procedure of Brown and Gamble (Human Fertility, volume 5, page 90, 1940). Aqueous solutions of this compound were tested for their bacteriostatic and/or bactericidal activity according to the United States Department of Agriculture Agar Cup Plate Method Circular No. 198.

These solutions showed strong bacteriostatic and/or bactericidal activity against a variety of organisms among which were the following:

| | ATCC |
|---|---|
| M. pyogenes var. aureus | 6538 |
| E. coli | 11105 |
| B. ammoniagenes | 6871 |
| B. substilis | 6633 |
| S. albus | 12228 |
| P. ovale | 12078 |
| C. acnes | 6921 |

What is claimed is:

1. A compound selected from the group consisting of monomeric condensation products of formaldehyde and allantoin in the proportions of 1 mole of allantoin to at least about 0.5 mole of formaldehyde having the formula:

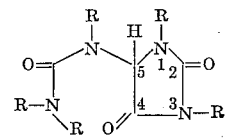

wherein each R is selected from the group consisting of H and $CH_2OH$, all R's not being simultaneously hydrogen and at least one R being $CH_2OH$, and their salts with acids and bases.

2. A clear, transparent, hard glossy film consisting essentially of a dried solution of a compound of claim 1.

3. A solution of a compound of claim 1 in a solvent therefore.

4. A composition for human, agricultural and industrial use, the essential active added ingredient of which is an effective amount of a compound of claim 1 and a carrier combined therewith.

5. A bactericidal composition comprising an aqueous solution of a water soluble condensation product of claim 1 containing a bactericidal amount of said product.

6. A powder composed of the film of claim 2 in finely ground form.

7. A compound selected from the group consisting of dimer condensation products of formaldehyde and allantoin in the proportions of 1 mole of allantoin to at least about 0.5 mole of formaldehyde wherein the monomeric units have the formula:

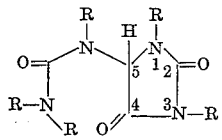

wherein each R is selected from the group consisting of H, CH$_2$OH and >CH$_2$, all R's not being simultaneously hydrogen and at least one R being >CH$_2$ which constitutes a methylene bridge to a nitrogen atom of another monomeric unit.

8. A clear, transparent, hard glossy film consisting essentially of a dried solution of a compound of claim 7.

9. A solution of a compound of claim 7 in a solvent therefore.

10. A composition for human, agricultural and industrial use, the essential active added ingredient of which is an effective amount of a compound of claim 7 and a carrier combined therewith.

11. A bactericidal composition comprising an aqueous solution of a water-soluble dimer of claim 7 containing a bactericidal amount of said product.

12. A powder composed of the film of claim 8 in finely ground form.

13. A compound selected from the group consisting of polymeric condensation products of formaldehyde and allantoin in the proportions of 1 mole of allantoin to at least about 0.5 mole of formaldehyde wherein the monomeric units have the formula:

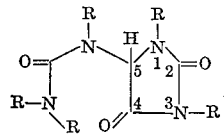

and wherein each R is selected from the group consisting of H, CH$_2$OH and >CH$_2$, all R's not being simultaneously hydrogen and at least two R's being >CH$_2$ constituting methylene bridges to corresponding and non-corresponding nitrogen atoms of additional monomeric units.

14. A clear, transparent, hard glossy film consisting essentially of a dried solution of a compound of claim 13.

15. A composition for human, agricultural and industrial use, the essential active ingredient of which is an effective amount of a compound of claim 13 and a carrier combined therewith.

16. A bactericidal composition comprising an aqueous solution of a water soluble polymer of claim 13 containing a bactericidal amount of said polymer.

17. A powder composed of the film of claim 14 in finely ground form.

References Cited by the Examiner

UNITED STATES PATENTS

| | | | |
|---|---|---|---|
| 2,392,505 | 1/1946 | Rogers | 260—309.5 |
| 2,467,884 | 4/1949 | Elias | 167—58 |
| 2,535,475 | 12/1950 | Anderson | 260—29.4 |
| 2,633,423 | 3/1953 | Bower | 260—67.5 |
| 2,863,842 | 12/1958 | Bonzagni | 260—29.4 |
| 2,934,438 | 4/1960 | Michener et al. | 99—150 |
| 2,934,439 | 4/1960 | Michener et al. | 99—150 |
| 2,943,979 | 7/1960 | Elias | 167—58 |
| 2,955,057 | 10/1960 | Gagliardi | 260—67.5 |

OTHER REFERENCES

Drug and Cosmetic Industry, 76 (1955), pages 768–9, 867–72 relied upon (copy in Scientific Library).

MURRAY TILLMAN, *Primary Examiner.*

JULIAN S. LEVITT, JAMES A. SEIDLECK, *Examiners.*